United States Patent [19]

Machado

[11] Patent Number: 5,274,040

[45] Date of Patent: * Dec. 28, 1993

[54] REINFORCED POLYKETONE POLYMERS

[75] Inventor: Joseph M. Machado, Destrehan, La.

[73] Assignee: Shell Oil Company, Houston, Tex.

[*] Notice: The portion of the term of this patent subsequent to Sep. 12, 2006 has been disclaimed.

[21] Appl. No.: 961,948

[22] Filed: Oct. 16, 1992

[51] Int. Cl.$^5$ .......................... C08F 8/00; C08K 5/07
[52] U.S. Cl. ................... 525/134; 524/449; 524/494; 524/502; 524/508; 524/593; 525/154; 525/502
[58] Field of Search .......... 525/134, 154, 502; 524/508, 449, 494, 502, 593

[56] References Cited

U.S. PATENT DOCUMENTS

| | | |
|---|---|---|
| H886 | 2/1991 | George . |
| 3,438,931 | 4/1969 | Mitchell et al. . |
| 4,843,144 | 6/1989 | Van Broekhoven et al. . |
| 4,866,122 | 9/1989 | Gerlowski et al. ............ 525/58 |
| 4,880,903 | 11/1989 | Van Broekhoven et al. . |
| 5,114,992 | 5/1992 | Hanley . |
| 5,122,564 | 6/1992 | George .................. 524/417 |
| 5,141,979 | 8/1992 | George et al. ............ 524/398 |
| 5,158,993 | 10/1992 | Proctor et al. . |
| 5,166,252 | 11/1992 | George .................. 524/449 |
| 5,166,266 | 11/1992 | Machado ............... 525/134 |

*Primary Examiner*—John Kight, III
*Assistant Examiner*—T Mosley
*Attorney, Agent, or Firm*—James O. Okorafor

[57] ABSTRACT

Reinforced polymer blends with improved mechanical properties are produced from a blend of a polyketone polymer and an uncured phenolic-based novolac resin, reinforced with glass fibers.

10 Claims, No Drawings

REINFORCED POLYKETONE POLYMERS

FIELD OF THE INVENTION

This invention relates to polyketone polymers reinforced with glass fibers. More particularly, this invention relates to a miscible blend of a polyketone polymer and a phenolic-based novolac resin filled with glass fibers.

BACKGROUND OF THE INVENTION

Polymers of carbon monoxide and olefin, generally referred to as polyketones, are well known in the art. The polyketone polymers of the subject invention are of a specific linear alternating type. Such polymers have utility as premium thermoplastics in the manufacture of a wide variety of shaped articles.

Novolac resins are a class of phenolic thermoset resins that are also well known in the art. The novolac resins are known to provide good thermal and dimensional properties at low cost when cross-linked using suitable curing agents. These resins are widely used in high-temperature and electrical applications, such as toaster and cooking pot handles, ashtrays, and switch gears.

Reinforcing a polymer with a filler often provides a less expensive product, in addition to desirable properties, such as stiffness and strength. For polyketone polymers, the presence of a coupling agent is often required to provide good adhesion between the polymer and filler through chemical or physical bonding. The phenolic-based novolac resin of the subject invention is miscible in the polyketone polymer, and is interfacially active with the glass surfaces. Thus, the novolac resin serves as an internal coupling agent for the glass-reinforced compositions of the invention.

SUMMARY OF THE INVENTION

The present invention provides improved reinforced polymer blends of a linear alternating polyketone polymer, a phenolic-based novolac resin, and glass fibers. The reinforced blends demonstrate improved mechanical properties, relative to the glass-reinforced polyketone polymers alone. The subject invention also includes articles manufactured from the reinforced blends, and articles coated with the reinforced blends.

DESCRIPTION OF THE INVENTION

The polyketone polymers of the invention are thermoplastic polymers of a linear alternating structure and contain substantially one molecule of carbon monoxide for each molecule of ethylenically unsaturated hydrocarbon. Hereinafter, these polymers may be simply referred to as polyketones. Ethylenically unsaturated hydrocarbons suitable for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule,, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene.

The preferred polyketone polymers are copolymers of carbon monoxide and ethylene or terpolymers of carbon monoxide, ethylene, and a second ethylenically unsaturated hydrocarbon of at least 3 carbon atoms, particularly an α-olefin such as propylene. When the preferred polyketone terpolymers are employed, there will be within the terpolymer at least about 2 units derived from a monomer of ethylene for each unit derived from a monomer of the second hydrocarbon. Preferably, there will be from about 10 units to about 100 units derived from a monomer of ethylene for each unit derived from a monomer of the second hydrocarbon. The polymer chain of the preferred polyketone polymers has recurring units represented by the formula

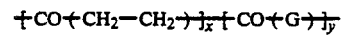

wherein G is derived from the monomer of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—CH—CH$_2$ units and the —CO—G— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent, so the polymers are fairly represented by the formula for the polymer chain as depicted above.

The properties of the polyketone polymer are greatly influenced by the molecular purity of the polymer, as measured by the extent to which the polymer consists of repeating units of the above formula. A polymer of substantially lower carbon monoxide content cannot exhibit the linear alternating nature of the above formula. A polymer made by other methods, such as by free radical polymerization, will not typically have the regular, linear alternating structure of the polyketone polymers of the invention.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt, or nickel, the anion of a strong non-hydrohalogenic acid, and a bidentate ligand of phosphorus, arsenic or antimony. U.S. Pat. No. 4,843,1144 (Van Broekhoven et al.) discloses a process for preparing polymers of carbon monoxide and at least one ethylenically unsaturated hydrocarbon using a catalyst comprising a compound of palladium, the anion of a nonhydrohalogenic acid having a pKa of below about 6 and a bidentate ligand of phosphorus.

The phenolic-based novolac resins of the subject invention are commercially available and well known in the art. These curable resins are the condensation product of a phenol and an aldehyde, when the aldehyde is present in a less than stoichiometric amount, and the reaction is conducted in an acid media. In a typical synthesis, novolacs are prepared by combining a slight molar excess of phenol, such as about 15%, with formaldehyde under acidic conditions at a temperature from about 25° C. to about 175° C.

The novolac structures produced in this reaction may be approximately represented by the following general formula:

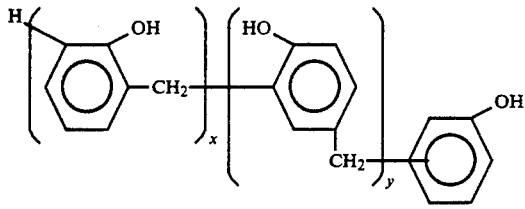

wherein the sum of x and y is from about 2 to about 200. Illustrative phenols, useful to prepare novolac resins, include phenol, cresol, xylenol, and substituted phenols such as ethylphenol, butylphenol, isopropylmethoxyphenol, chlorophenol, resorcinol, naphthol, and the like and mixtures of such phenols. Illustrative aldehydes include formaldehyde, paraform, acetaldehyde, acrolein, furfural, and the like.

U.S. Pat. No. 3,438,931 (Mitchell et al.), incorporated herein by reference, discloses both resole and novolac resins, their methods of production, as well as uses for such resins.

Novolac resins are not heat-curable per se. Heat-curable resins progressively polymerize under application of heat. Novolac resins are cured in the presence of a curing agent, such as formaldehyde, hexamethylenetetramine, paraformaldehyde, and the like. In the presence of such curing agents, novolac resins are heat-curable.

The novolac resins of the invention are employed as an uncured blend component, in combination with the polyketone polymer of the invention. Consequently, the novolac resins are used in the absence of a curing agent. The novolac resins of the invention have a molecular weight of from about 1,000 to about 20,000 on a weight average basis. Molecular weights that are relatively high, such as 10,000 to 20,000 on a number average basis, are preferred, to provide a relatively high viscosity material.

The precise percentage of the novolac resin to be employed in the reinforced blends of the invention will depend upon the anticipated end use for the blend. Compositions containing from about 1 wt % to about 10 wt %, based on total reinforced blend, of the novolac resin are believed to be satisfactory, with 3 wt % to 7 wt % being preferred.

The blends of the invention are reinforced by the presence of glass fiber. The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the glass fiber of the invention is produced is the more common alkali metal silicate glass, particularly a borosilicate glass. Fibers produced of such glass are conventional and are commercially available from a number of companies. The fibers are useful as reinforcements for polymeric products and are commercially used as such. Short, chopped glass fibers with a circular cross section are preferred. The glass fibers are preferably obtained from the manufacturer with a surface treatment compatible with the polyketone polymer, such as a polyurethane sizing.

The glass fibers are employed in a quantity from about 10 wt % to about 40 wt % based on total reinforced blend, and preferably in a quantity of from about 25 wt % to about 40 wt % on the same basis.

The method of producing the reinforced blends of the invention is not critical so long as an intimate mixture of the three components is produced without undue degradation of the components or the resulting reinforced blend. The novolac resin may simply be combined with the polyketone polymer in a compounding process. In one modification the components are dry mixed and converted to a reinforced blend by application of elevated temperature and pressure. In an alternate modification, the components are passed through an extruder to produce the reinforced blend as an extrudate. The components are also usefully blended in a mixer which operates at elevated temperature and at high shear.

The reinforced blends of the invention may also include additives such as antioxidants and stabilizers, other fillers and reinforcements, mold release agents, fire retarding chemicals, colorants, and other materials which are designed to improve the processability of the polymer or the properties of the resulting blend. Such additives are added together with, prior to or subsequent to the blending of the polymeric and glass fiber components.

The glass-reinforced polyketone/novolac blends have properties that are improved relative to the glass-reinforced polyketone blends. In particular, the reinforced polyketone/novolac blends exhibit improved tensile strength. The reinforced blends of the invention are therefore particularly useful where molded parts are desired which require strength despite exposure to elevated temperatures. Illustrative of such applications are the production of both external and internal parts for automotive applications and structural parts for application in the construction industry.

The invention is further illustrated by the following Examples which should not be regarded as limiting.

EXAMPLE 1

A linear alternating terpolymer of carbon monoxide, ethylene, and propylene (90/067) was produced in the presence of a catalyst composition formed from palladium acetate, trifluoroacetic acid and 1,3-bis[di(2-methoxyphenyl)-phosphino]propane. The polyketone polymer had a melting point of about 221° C. and an LVN of about 1.15 dl/g when measured in m-cresol at 60° C. The polyketone polymer also contained conventional additives.

EXAMPLE 2

The polyketone terpolymer of Example 1 was blended with a phenolic-based novolac resin obtained from Georgia-Pacific, with and without two different types of chopped glass fiber. Prior to compounding, polyketone pellets and novolac flake were dried separately under vacuum at 50° C. for 16 hours. Blends were prepared by combining the desired ratio of polyketone pellets, novolac flake, and chopped glass fiber, and tumble-blending the combination for several minutes. The tumbled mixture was then added to a 30 mm Haake co-rotating twin screw extruder operating at 250° C. and 200 RPM. The extrudate strand was passed through a water bath and then through a pelletizer.

Subsequent to compounding, the pelletized blends were dried and molded into standard test specimens using a 25 ton Arburg injection molding machine. Molded specimens were stored over desiccant until tested. Mechanical testing was performed on "dry as molded" samples.

Flexural modulus, flexural strength, and tensile strength for the various samples are shown in Table 1. The mechanical properties of the neat polyketone polymer reinforced with glass fibers are improved by the addition of a small amount (3 to 10 wt %) of novolac resin. The addition of even a small amount of novolac resin significantly improved the tensile strength and flexural strength of the glass-filled polyketone. This effect is believed to occur because the novolac resin acts as an internal coupling agent, enhancing adhesion between the polyketone polymer and the glass fibers.

Other embodiments if the invention will be apparent to those skilled in the art from a consideration of this specification, or by practice of the invention described herein. It is intended that the specification and examples be considered as exemplary only, with the true scope and spirit of the invention being indicated by the following claims.

TABLE 1

| Polyketone (wt %) | Novolac (wt %) | Glass Fibers (wt %) | Glass Type | Flexural Modulus (k psi) | Tensile Strength (k psi) | Flexural Strength (k psi) |
| --- | --- | --- | --- | --- | --- | --- |
| 70 | 0 | 30 | PPG | 993 | 17.3 | 18.4 |
| 67 | 3 | 30 | PPG | 1038 | 18.5 | 18.8 |
| 70 | 0 | 30 | OCF | 895 | 12.1 | 18.1 |
| 67 | 3 | 30 | OCF | 851 | 15.5 | 22.2 |
| 63 | 7 | 30 | OCF | 910 | 16.5 | 24.1 |
| 60 | 10 | 30 | OCF | 979 | 17.5 | 24.9 |

[1]Secant Modulus at 1% strain.

What is claimed is:

1. A reinforced polymer blend composition comprising:
    a linear alternating polyketone polymer, wherein the polyketone polymer has recurring units represented by the formula

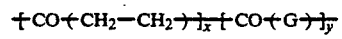

wherein G is derived from a monomer of an α-olefin of at least 3 carbon atoms polymerized through the ethylenic unsaturation and the ratio of y:x is no more than about 0.5, wherein the polyketone is the major component of the reinforced polymer blend,
    from about 1 wt % to about 10 wt %, based on total reinforced blend, of a novolac resin, and
    glass fiber.

2. The composition of claim 1 wherein the glass fibers are present at from about 10 wt % to about 40 wt %, based on total reinforced blend.

3. The composition of claim 2 wherein the ratio of y:x is from about 0.01 to about 0.1, and G is a moiety of propylene.

4. The composition of claim 3 wherein the novolac resin is present at from about 3 wt % to about 7 wt %, based on total reinforced blend.

5. The composition of claim 4 wherein the glass fibers are present at from about 25 wt % to about 40 wt %, based on total reinforced blend.

6. The composition of claim 1 wherein the y is 0.

7. The composition of claim 6 wherein the novolac resin is present at from about 3 wt % to about 7 wt %, based on total reinforced blend.

8. The composition of claim 7 wherein the glass fibers are present at from about 25 wt % to about 40 wt %, based on total reinforced blend.

9. An article manufactured from the composition of claim 1.

10. An article coated with the composition of claim 1.